United States Patent
Figura et al.

(10) Patent No.: US 10,384,710 B2
(45) Date of Patent: Aug. 20, 2019

(54) ELECTRIC POWER ASSISTED STEERING SYSTEM FOR VEHICLES

(71) Applicant: FORD GLOBAL TECHNOLOGIES, LLC, Dearborn, MI (US)

(72) Inventors: Michael Georg Figura, Dormagen (DE); Erik Jurgen Stumpf, Bedburg (DE)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 86 days.

(21) Appl. No.: 14/151,445

(22) Filed: Jan. 9, 2014

(65) Prior Publication Data

US 2014/0190288 A1 Jul. 10, 2014

(30) Foreign Application Priority Data

Jan. 10, 2013 (DE) .................. 10 2013 200 259

(51) Int. Cl.
*B62D 5/00* (2006.01)
*B62D 5/04* (2006.01)
(Continued)

(52) U.S. Cl.
CPC ............ *B62D 5/0421* (2013.01); *B62D 3/04* (2013.01); *B62D 5/0409* (2013.01); *F16H 55/24* (2013.01);
(Continued)

(58) Field of Classification Search
CPC .. B62D 5/0403; B62D 5/0427; B62D 5/0472; B62D 5/04; H02K 7/1166
(Continued)

(56) References Cited

U.S. PATENT DOCUMENTS 2,928,961 A * 3/1960 Morrill .................. F16F 15/08
310/51
3,801,229 A * 4/1974 Henderson ............ F04C 15/00
417/359
(Continued)

FOREIGN PATENT DOCUMENTS

CN 102398628 A 4/2012
CN 102530057 A 7/2012
(Continued)

OTHER PUBLICATIONS

English Translation of JP 2003-026009 and machine translations of JP 2011-219036 and JP 2013-025267.*
(Continued)

*Primary Examiner* — Victor L MacArthur
(74) *Attorney, Agent, or Firm* — Jones Robb, PLLC; Raymond Coppiellie

(57) ABSTRACT

An electric power assisted steering system for vehicles is disclosed. The system includes an electric motor drive having a motor housing, a motor shaft, and at least a first bearing and a second bearing for mounting the motor shaft. At least one bearing plate receives one of the first and second bearings and the other of the first and second bearings is fixed in place on the motor housing in a radial direction. The system further includes a worm gear shaft operably connected to the motor shaft so as to be driven by the motor shaft, a worm gear wheel received in a transmission housing, the worm gear shaft meshing with the worm gear wheel, and at least one elastic element elastically coupling the at least one bearing plate to the motor housing such that the motor housing can tilt with respect to the at least one bearing plate.

7 Claims, 2 Drawing Sheets

(51) Int. Cl.
   *B62D 3/04* (2006.01)
   *F16H 57/021* (2012.01)
   *F16H 55/24* (2006.01)

(52) U.S. Cl.
   CPC . *F16H 2057/0213* (2013.01); *Y10T 74/18792* (2015.01)

(58) Field of Classification Search
   USPC ............ 310/51; 74/388 PS, 392, 396, 89.14, 74/606 R; 180/444
   See application file for complete search history.

(56) References Cited

U.S. PATENT DOCUMENTS

| | | | | |
|---|---|---|---|---|
| 5,332,371 A | * | 7/1994 | Dantlgraber | F04B 1/2014 417/271 |
| 5,668,422 A | * | 9/1997 | Deynet | B60T 8/3675 310/239 |
| 6,491,131 B1 | * | 12/2002 | Appleyard | B62D 5/0409 180/444 |
| 6,626,058 B2 | | 9/2003 | Ueda | B23Q 16/025 29/48.5 R |
| 6,662,897 B2 | | 12/2003 | Tatewaki | |
| 7,748,492 B2 | * | 7/2010 | Iwasa | B62D 5/0409 180/444 |
| 8,459,402 B2 | * | 6/2013 | Hamakita | B62D 5/0409 180/443 |
| 8,517,141 B2 | * | 8/2013 | Kim | B62D 5/0409 180/444 |
| 8,549,945 B2 | * | 10/2013 | Rho | B62D 5/0409 384/256 |
| 8,567,553 B2 | | 10/2013 | Hamakita | |
| 2004/0168849 A1 | * | 9/2004 | Honaga | B62D 5/0421 180/444 |
| 2005/0052087 A1 | * | 3/2005 | Shinmura | F16H 57/025 310/89 |
| 2005/0183923 A1 | * | 8/2005 | Konishi | F16D 27/112 192/84.961 |
| 2006/0086559 A1 | * | 4/2006 | Segawa | B62D 1/16 180/444 |
| 2006/0117889 A1 | * | 6/2006 | Segawa | B62D 5/0409 74/425 |
| 2008/0060894 A1 | * | 3/2008 | Koyama | F16F 7/1011 188/379 |
| 2008/0190229 A1 | * | 8/2008 | Dodak | B62D 3/12 74/388 PS |
| 2008/0277193 A1 | * | 11/2008 | Yoshioka | B62D 5/0403 180/444 |
| 2010/0330352 A1 | * | 12/2010 | Feng | C08J 5/124 428/220 |
| 2011/0017542 A1 | * | 1/2011 | Kim | B62D 5/0409 180/444 |
| 2011/0120797 A1 | * | 5/2011 | Kitahata | B62D 5/04 180/443 |
| 2011/0155499 A1 | * | 6/2011 | Wilkes | B62D 5/0409 180/444 |
| 2012/0061168 A1 | * | 3/2012 | Hamakita | B62D 5/0409 180/444 |
| 2012/0227526 A1 | * | 9/2012 | Lescorail | F16H 57/022 74/406 |

FOREIGN PATENT DOCUMENTS

| | | | | |
|---|---|---|---|---|
| CN | 102678883 A | | 9/2012 | |
| DE | 10051306 A1 | | 4/2002 | |
| EP | 1344710 B1 | | 9/2003 | |
| JP | 2003026009 A | * | 1/2003 | |
| JP | 2004284505 A | | 10/2004 | |
| JP | 2005110404 A | * | 4/2005 | |
| JP | 2011219036 A | * | 11/2011 | |
| JP | 2011219036 A | * | 11/2011 | ........ B62D 5/0409 |
| JP | 2012025267 A | * | 2/2012 | |
| JP | 2012025267 A | * | 2/2012 | ........ B60K 7/0007 |

OTHER PUBLICATIONS

Notification of First Office Action for related Chinese Patent Application No. 201410008286.8, dated Jan. 5, 2017, with an English Translation.

* cited by examiner

ELECTRIC POWER ASSISTED STEERING SYSTEM FOR VEHICLES

CROSS REFERENCE TO RELATED APPLICATIONS

This application claims priority to German Application No. 102013200259.9, filed on Jan. 10, 2013, the entire content of which is incorporated by reference herein.

TECHNICAL FIELD

The present disclosure relates generally to electric power assisted steering systems. In particular, the present disclosure relates to electric power assisted steering systems for motor vehicles.

BACKGROUND

Electric power assisted steering systems that use the principle of superimposing a torque and electric power assisted steering systems that use the principle of superimposing a steering angle are generally known. Such systems make use of a reduction gear, such as a worm drive or worm gear comprising a worm gear shaft and a worm gear wheel. The worm gear wheel is generally made of a synthetic material that may change size in the presence of varying environmental conditions, such as, for example, temperature and moisture. Moreover, the worm gear wheel may change its size over the course of its serviceable life as a result of wear.

Manufacturing tolerances in the components of the worm drive also influence the amount of play in the meshing arrangement between the worm gear wheel and the worm gear shaft. Such play in this meshing arrangement can be problematic owing to the fact that, for example, noises can occur in the meshing arrangement as the direction of the loading changes. Furthermore, the magnitude of the transmitted power can be reduced and the driver may notice a change in the steering sensation.

It may, therefore, be advantageous to provide an electric power assisted steering system in which play in the meshing arrangement between the worm gear shaft and the worm gear wheel is substantially reduced or eliminated. Moreover, the system is simplified and utilizes minimal components to eliminate play in the meshing arrangement in order to reduce costs, facilitate the assembly process, and to keep the required installation space as small as possible.

SUMMARY

In accordance with various exemplary embodiments, the present disclosure provides an electric power assisted steering system for vehicles. The system comprises an electric motor drive having a motor housing, a motor shaft, at least a first bearing and a second bearing for mounting the motor shaft and at least one bearing plate for receiving one of the first and second bearings. The other of the first and second bearings is fixed in place on the motor housing in a radial direction. The system further comprises a worm gear shaft operably connected to the motor shaft so as to be driven by the motor shaft, a worm gear wheel received in a transmission housing, the worm gear shaft meshing with the worm gear wheel, and at least one elastic element elastically coupling the at least one bearing plate to the motor housing such that the motor housing can tilt with respect to the at least one bearing plate.

The elastic element may be arranged between the motor housing and the bearing plate in an axial direction, which is fixed by means of the motor shaft.

The at least one bearing plate may be mounted in a non-elastic manner on the transmission housing.

The at least one bearing plate may comprise a first part and a second part. The first part may be proximate to the motor and mounted in a non-elastic manner on the motor housing. The second part may be remote from the motor and mounted in a non-elastic manner on the transmission housing. The elastic element may be arranged between the first part and the second part.

The elastic element may be less rigid in an axial direction than in a direction tangential thereto.

The at least one bearing plate may be mounted in an eccentric manner on the transmission housing.

In accordance with another aspect of the present disclosure, an electric power assisted steering system comprises an electric motor comprising a motor housing, and a motor shaft rotatably supported in the housing, a worm gear shaft operatively connected to the motor shaft and extending into a transmission housing, and a worm gear wheel positioned in the transmission housing. The motor housing is tiltable relative to the transmission housing to move the worm gear shaft toward and/or away from the worm gear wheel.

The system may further comprise an elastic element positioned between the motor housing and the transmission housing. A bearing plate may be provided, wherein a first side of bearing plate is connected to the elastic element and a second side of the bearing plate is connected to the transmission housing.

The motor shaft may be rotatably supported by a first bearing. A second bearing may be received in a bearing plate connected to the transmission housing.

The motor may further comprise a rotor and a stator, wherein an air gap between the rotor and the stator remains essentially constant during tilting of the motor housing.

The bearing plate may comprise a first part and a second part, wherein the first and second parts of the bearing plate are connected by an elastic element. The bearing plate may connect the motor housing to the transmission housing to permit tilting of the motor housing relative to the transmission housing. The bearing plate may be eccentrically mounted to the transmission housing.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

Figure 1:
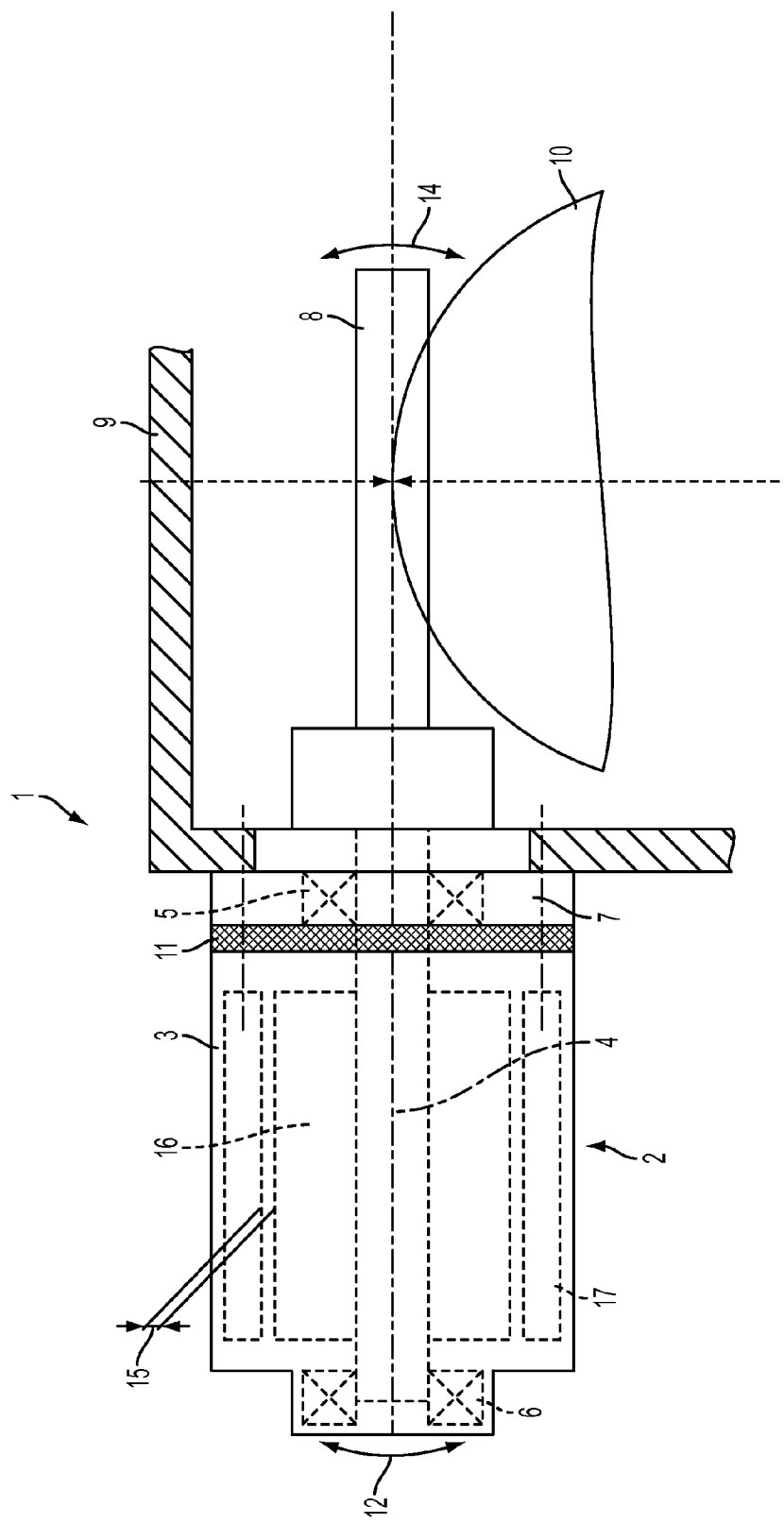
FIG. 1 is a lateral cross-sectional view of an exemplary embodiment of an electric power assisted steering system in accordance with the present disclosure.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

Electric power assisted steering systems may use the principle of superimposing a torque and or the principle of superimposing a steering angle. Such systems include an electric motor is mounted in a motor housing. The driven shaft (motor shaft) of the electric motor is connected to a coaxial worm gear shaft. The worm gear shaft may be a part of the motor shaft or coupled to it. The worm gear shaft meshes with a worm gear wheel that may be mounted in transmission housing and is itself used to drive the steering system.

In the case of an electric power assisted steering system that uses the principle of superimposing a torque, the term "drive" is understood to mean that a torque is applied for the purpose of driving the steering system and/or an auxiliary torque is applied for the purpose of reducing the manual force that a driver needs to apply to the steering wheel. The magnitude of the applied torque is controlled by means of a control process by way of a torque sensor and if necessary other input data. The torque can be introduced into a steering column or into a steering pinion that meshes with the gear rack.

In the case of an electric power assisted steering system that uses the principle of superimposing a steering angle, which is also described as an active steering system or active steering (AFS (active front steering)), the term "drive" is understood to mean the change in the steering ratio between the steering wheel and the steered wheels of a vehicle in dependence upon the velocity of the vehicle. This is achieved, for example, with the aid of a planetary gear that is arranged upstream of the actual steering gear, wherein the angle of the input shaft (steering wheel) and of the output shaft (steering gear pinion) are transmitted by way of sun gears and planetary wheels. In the case of superimposing a steering angle, the electric motor drives, for example, the planetary gear carrier that results in an additional relative movement about the sun gears. This movement produces the desired superimposition of a steering angle and/or the change in the steering ratio.

In accordance with the present disclosure, an exemplary embodiment of an electric power assisted steering system includes an electric motor having a motor housing, a motor shaft, at least two bearings for mounting the motor shaft and at least one bearing plate that is arranged relative to the motor housing. The electric power assisted steering system further includes a worm drive. The worm drive includes a worm gear shaft and a worm gear wheel housed in a transmission housing, wherein the structure of the electric power assisted steering system is arranged to bias the worm gear shaft toward the worm gear wheel so as to form a meshing arrangement and to substantially reduce and/or eliminate play between the worm gear shaft and the worm gear wheel in such a meshing arrangement. The bearing plate receives one of the bearings and the other bearing is fixed in place on the motor housing in the radial direction. The bearing plate is mounted by means of at least one elastic element in an elastic manner on the motor housing in such a manner that the motor housing can tilt with respect to the bearing plate.

Since the motor shaft is fixed in place on the motor housing in one of the two bearings in the radial direction, the motor shaft tilts and as a result tilts the worm gear shaft, which is driven by the motor shaft and is connected to the motor shaft. The worm gear shaft may be formed as a part of the motor shaft, or may be coupled to the motor shaft and, thus, form an extension of the motor shaft. The worm gear shaft tilts by essentially the same angle that the motor housing tilts with respect to the bearing plate. This renders it possible, depending upon the direction of tilt, for the worm gear shaft to move towards or away from the worm gear wheel. In this manner it is possible to control the meshing arrangement between the worm gear shaft and the worm gear wheel by way of the elastic element both in the radial direction and also in the tangential direction in relation to the worm gear wheel. It is thus possible, for example, to damp by means of the elastic element any impacts in the meshing arrangement of the two transmission elements (i.e., worm gear shaft and worm gear wheel) both in the radial direction and also in the tangential direction. Moreover, it is also possible in this manner to compensate for manufacturing tolerances in the components of the two transmission elements and changes in size of the components as a result of changing environmental conditions, for example temperature or moisture, and also as a result of wear. The solution is in addition extremely compact and requires few components and a small amount of installation space.

Furthermore, an air gap that is formed between the rotor that is arranged on the motor shaft and the stator that is fastened to the motor housing remains essentially constant as the motor housing tilts, so that the level of efficiency of the electric motor also remains essentially constant.

In accordance with the present disclosure, an alternative exemplary embodiment of an electric power assisted steering system provides that the bearing plate is mounted in a non-elastic manner on the transmission housing. Consequently, the bearing of the motor shaft, which bearing is received in the bearing plate, is arranged in a fixed manner on the transmission housing, thus providing a relatively rigid system.

In accordance with another embodiment of the present disclosure, the elastic element is arranged between the motor housing and the bearing plate in an axial direction that is fixed by means of the motor shaft. Although it is necessary for the elastic element to absorb torques and torsional stresses, the elastic element is not subjected to radial forces.

In another exemplary embodiment of the present disclosure, the elastic element comprises a considerably reduced level of rigidity and/or a considerably greater level of elasticity in the axial direction (along the motor axis) which is fixed by means of the motor shaft, than in the direction tangential thereto. For example, the range of elasticity may be between 2-20 kN/mm. Accordingly, the elastic element provides a sufficient level of resistance for the transmission of greater torques, wherein simultaneously torsional stresses of the motor housing and also pure axial movements of the motor housing can be absorbed in an elastic manner.

In accordance with a further exemplary embodiment of the present disclosure, the bearing plate is comprises at least in two parts. The bearing comprises a first part that is close to the motor and that is mounted in a non-elastic manner on the motor housing and that receives one of the bearings, and a second part that is remote from the motor and that is mounted in a non-elastic manner on the transmission housing. The elastic element may be arranged between the first and the second part. In this manner, the bearing plate that is embodied in this manner renders it possible to mount the motor housing in a completely elastic manner. This embodiment has the essential advantage that the air gap between the rotor, which is sitting on the motor shaft, and the stator, which is fastened to the motor housing, remains precisely constant during any tilt movements of the motor housing with respect to the bearing plate. The elastic element is advantageously vulcanized in each case onto the part that is close to the motor and onto the part that is remote from the motor. Accordingly, the two-part bearing plate is embodied in a similar manner to that of a rubber-metal bearing, wherein the two metal bearing parts are mutually connected by way of the elastic element.

In accordance with another exemplary embodiment of the present disclosure, the bearing plate may be mounted in an eccentric manner on the transmission housing. The eccentric mounting of the bearing plate on the transmission housing renders it possible to adjust the gear backlash between the worm gear shaft and the worm gear wheel, in other words to place this meshing arrangement under bias and consequently to remove the gear backlash completely.

The elastic element is preferably a rubber-elastic element, in other words an element that is embodied from a rubber material or a material that is similar to rubber, for example in the form of a ring, an annular disk or a washer.

An essential advantage of the power assisted steering system in accordance with the present disclosure is that the steering system can be used both for superimposing a torque and also for superimposing a steering angle. Thus, the worm gear shaft is driven by means of the motor shaft of the electric motor that is mounted as previously described in an elastic manner in the motor housing by means of the elastic element and the worm gear shaft meshes with the worm gear wheel that is in turn mounted in the transmission housing. The rotational movement of the worm gear wheel can then be used for the purpose of applying the torque for driving the steering system and/or for providing an auxiliary torque in order to reduce the manual force that a driver has to apply to the steering wheel (superimposition of the torque). To the same extent, the power assisted steering system in accordance with the present disclosure can also be used to change the steering ratio between the steering wheel and the steered wheels of the vehicle by means of the worm gear transmission for example in dependence upon the velocity of the vehicle (superimposition of the steering angle).

As disclosed herein and illustrated in the exemplary embodiment of FIG. 1, an electric power assisted steering system 1 comprises an electric motor 2 having a motor housing 3, a motor shaft 4, a first bearing 5, a second bearing 6 for mounting the motor shaft 4, and a bearing plate 7 for receiving the first bearing 5. The second bearing 6 is fixed in place on the motor housing 3 at least in the radial direction.

As shown in FIG. 1, the motor shaft 4 drives a worm gear shaft 8, which meshes with a worm gear wheel 10, which is received in a transmission housing 9. The housings may be made from materials such as aluminum or magnesium or plastics such as polyamides (PA6) or acrylonitrile butadiene styrene (ABS). The worm gear wheel may be made of plastics such as polyamides (PA6, PA6.6), engineering thermoplastics such as polyoxymethylene (POM), metals, or sinter metals. The worm gear shaft 8 is formed as a part of the motor shaft 4 or is connected to motor shaft 4 by means of a coupling (not shown). When a coupling is used, the coupling holds the worm gear shaft 8 in a coaxial manner with respect to the motor shaft 4.

As also shown in FIG. 1, bearing plate 7 is mounted in an elastic manner on the motor housing 3 by means of an elastic element 11. The elastic element 11 permits the motor housing 3 to tilt with respect to the bearing plate 7, as indicated in FIG. 1 by means of a movement arrow 12. The bearing plate 7, in the case of the exemplary embodiment illustrated in FIG. 1, is mounted in a non-elastic manner on the transmission housing 9 by means of screws (not shown). The elastic element 11 is arranged between the motor housing 3 and the bearing plate 7 in an axial direction, which is fixed by means of the motor shaft 4, as shown in FIG. 1. As discussed above, elastic element 11 is preferably a rubber-elastic element, and may be in the form of a ring, an annular disk a washer, or other suitable shape. The elastic element may be made from any suitable material, such as, for example, natural rubber (NR), nitrile rubber (NBR), hydrogenated nitrile rubbers (HNBR), or ethylene propylene diene monomer rubber (EPDM).

The motor shaft 4 is fixedly mounted in the bearing 6 in the radial direction with respect to the motor housing 3 and worm gear shaft 8 is held in a coaxial manner with respect to motor shaft 4. For this reason, the tilt movement 12 of the motor housing 3 also results in a movement of the worm gear shaft 8 towards or away from the worm gear wheel 10. This movement of the worm gear shaft 8 is illustrated in FIG. 1 by movement arrow 14. As a result of the elastic element 11 that is arranged between the motor housing 3 and the bearing plate 7, the power assisted steering system 1 is able to compensate for movements of the meshing arrangement both in the radial direction of the worm gear wheel 10 and also in the tangential direction of the worm gear wheel 10. That is, the elastic element 11 allows the worm gear shaft 8 to maintain connection with worm gear wheel 10 during any radial or tangential movement of the worm gear wheel due, for example, to vibration, to impact loads, and to normal steering loads. In addition, elastic element 11 compensates for any radial or tangential shifts in position of worm gear 8 relative to worm gear wheel 10 due to changes in the size of the worm gear shaft and/or the worm gear wheel due to environmental changes such as temperature and/or moisture, due to wear of parts, and/or due to machining tolerances.

In order to be able to transmit simultaneously likewise high torques from the electric motor 2 to the worm gear wheel 10, the elastic element 11 that is used in the exemplary embodiment of FIG. 1 has a considerably reduced level of rigidity and/or a considerably higher level of elasticity in the axial direction, which is fixed by means of the motor shaft, than in a direction that is tangential thereto. For example, the elastic element may have an elasticity of 2-20 kN/mm in an axial direction (i.e., along a direction of the motor axis), an elasticity of about 0.1-5 kN/mm in a direction tangential to the motor axis (i.e., to counteract motor torque), and in a direction radial to the worm wheel (i.e., pushing the worm gear shaft away from the worm gear wheel), an elasticity of 0.5-5 kN/mm. Accordingly, the moments of tilt and/or the torsional stress of the electric motor 2 can be absorbed in an elastic manner and simultaneously high torques can be output by the electric motor 2 to the worm gear shaft 8.

The exemplary power assisted steering system illustrated in FIG. 1 makes it possible to compensate for manufacturing tolerances in the components of the two transmission elements 8 and 10 and changes in size of the components as a result of changing environmental conditions, for example temperature or moisture, and also as a result of wear of the transmission elements 8 and 10. The solution proposed is in addition extremely compact and requires few components and a small amount of installation space. Furthermore, an air gap 15 that is formed between a rotor 16 that is arranged on the motor shaft 4 and the stator 17 that is fastened to the motor housing 3 remains essentially constant as the motor housing 3 tilts, so that the level of efficiency of the electric motor also remains essentially constant.

Figure 2:
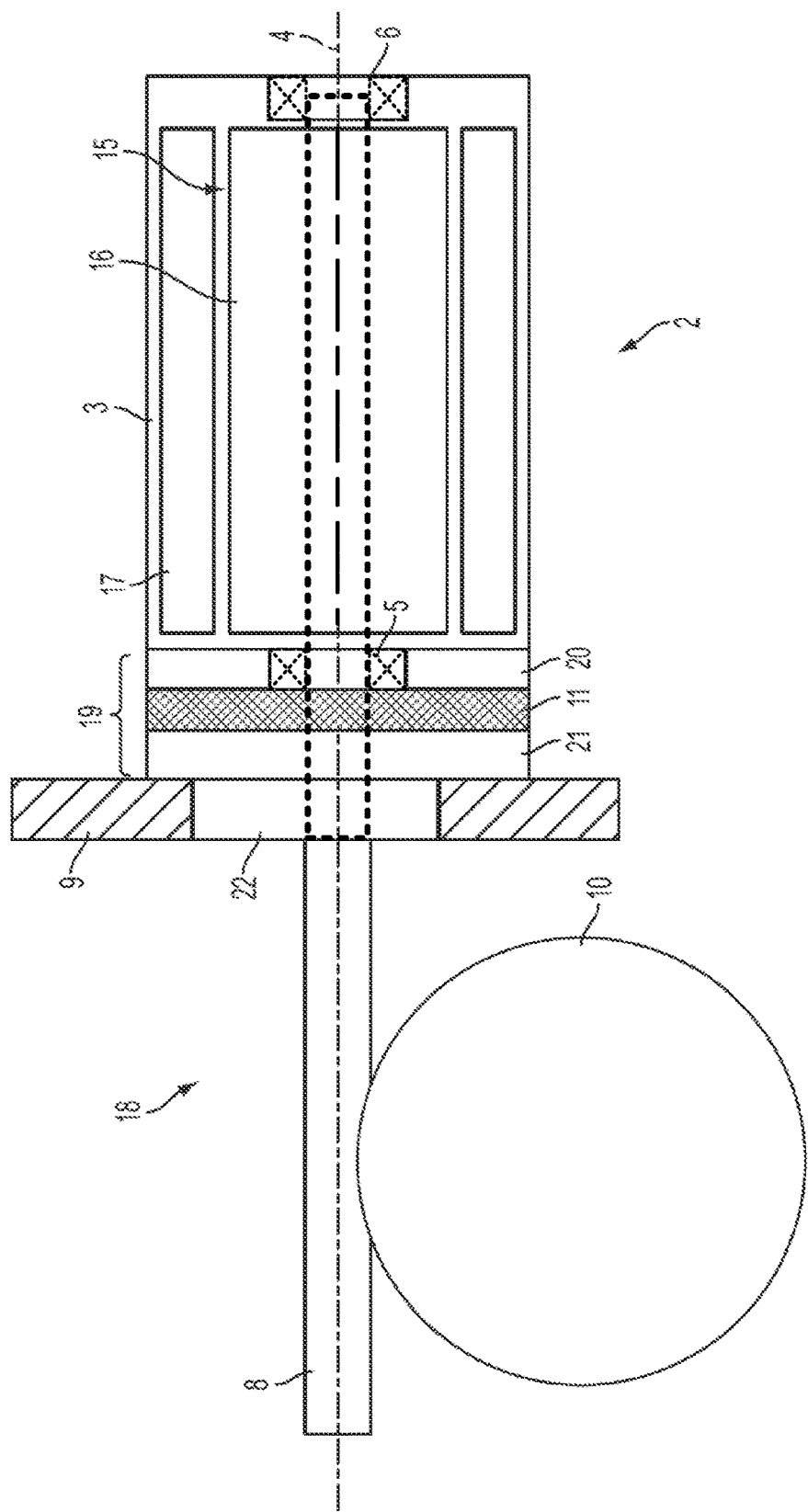
FIG. 2 is a lateral cross-sectional view of an alternative exemplary embodiment of an electric power assisted steering system in accordance with the present disclosure.

As disclosed herein and illustrated in the exemplary embodiment of FIG. 2, an electric power assisted steering system 18 differs from the power assisted steering system 1 essentially by virtue of the structure of the bearing plate. In the case of the exemplary embodiment illustrated in FIG. 1, the bearing plate 7 is embodied as a single piece. The power assisted steering system 18 illustrated in FIG. 2 comprises a multi-part bearing plate 19. In particular, the bearing plate 19 comprises a two-part structure having a first part 20 that is close to the motor and a second part 21 that is remote from the motor, which two-part structure is fixed in the axial direction by means of the motor shaft 4.

As illustrated in FIG. 2, the power assisted steering system 18 comprises an electric motor 2 having a motor housing 3, a motor shaft 4, a first bearing 5, a second bearing 6 for mounting the motor shaft 4, and a bearing plate 19.

The first part 20 of the bearing plate 19, which first part is close to the motor 2, is mounted in a non-elastic manner on the motor housing 3 and receives the front bearing 5 of the motor shaft 4. The second part 21 of the bearing plate 19, which second part is remote from the motor, is mounted in a non-elastic manner on the transmission housing 9. An elastic element 11 is arranged between the first part 20 and the second part 21 of bearing plate 19. In particular, the elastic element 11, for example a rubber disk, is vulcanized in each case onto the part 20 that is close to the motor and onto the part 21 that is remote from the motor. Thus, the bearing plate 19 is embodied in a similar manner to that of a rubber-metal bearing, wherein the two metal parts 20 and 21 are mutually connected by way of the rubber-elastic element 11. Rubber-elastic element 11 may take on any suitable shape, such as, for example, a disk, and may have a diameter that is slightly less than an outer diameter of the motor housing.

The electric power assisted steering system 18 illustrated in FIG. 2 provides a beneficial configuration in which the air gap 15 between the rotor 16, which sits on the motor shaft 4, and the stator 17, which is fastened in the motor housing 3, remains precisely constant with respect to the bearing plate 19 during any tilt movements of the motor housing 3, since the entire electric motor 2 is mounted on the transmission housing 9 in an elastic manner by way of the bearing plate 19.

As illustrated in FIG. 2, the bearing plate 19, in particular the part 21 that is remote from the motor 2, is moreover mounted in an eccentric manner on the transmission housing 9 by way of an eccentric mount element 22. It is possible in this manner to provide a bias in the meshing arrangement between the worm gear shaft 8 and the worm gear wheel 10 and to eliminate the gear backlash. Manufacturing tolerances in the components of the two transmission elements 8 and 10 and also changes in the size of the components of the transmission elements as a result of changing environmental conditions, for example temperature and moisture, and also as a result of wear are compensated for by means of the elastic element 11, as previously described with reference to the exemplified embodiment illustrated in FIG. 1 and also in the general part of this description.

The above-described power assisted steering system is not limited to the embodiments disclosed herein but rather also includes any like-functioning embodiments. In particular, the electrical power assisted steering system in accordance with the present disclosure and described herein is not limited to the use of a power assisted steering system for superimposing a torque but rather can likewise be used for a power assisted steering system for superimposing a steering angle, wherein in the latter case the steering angle is superimposed by means of the worm gear transmission illustrated herein.

In an exemplary embodiment, the electric power assisted steering system in accordance with the present disclosure is used for steering a motor vehicle both by means of superimposing a torque and also by means of superimposing a steering angle.

While the present disclosure has been disclosed in terms of exemplary embodiments in order to facilitate better understanding of the present disclosure, it should be appreciated that the present disclosure can be embodied in various ways without departing from the principle of the disclosure. Therefore, the present disclosure should be understood to include all possible embodiments which can be embodied without departing from the principle of the disclosure set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. Other embodiments of the disclosure will be apparent to those skilled in the art from consideration of the specification and practice of the disclosure disclosed herein. It is intended that the specification and embodiment described herein be considered as exemplary only.

What is claimed is:

1. An electric power assisted steering system, comprising:
   an electric motor comprising a motor housing, and a motor shaft rotatably supported in the motor housing;
   a worm gear shaft operatively connected to the motor shaft and extending into a transmission housing;
   a worm gear wheel positioned in the transmission housing; and
   a bearing plate comprising a first portion coupled to the motor housing, a second portion coupled to the transmission housing, and an elastic element fastening and elastically coupling the first portion to the second portion;
   wherein the motor housing is tiltable relative to the transmission housing to move the worm gear shaft toward and/or away from the worm gear wheel; and
   wherein the motor housing is tiltable a first amount under a given force applied to the motor housing in an axial direction and tiltable a second amount greater than the first amount under the same given force applied to the motor housing in a direction tangential to the axial direction.

2. The system of claim 1, wherein the motor shaft is rotatably supported by a first bearing.

3. The system of claim 2, further comprising a second bearing, the second bearing received in the second portion of the bearing plate.

4. The system of claim 1, wherein the motor further comprises a rotor and a stator, and wherein an air gap between the rotor and the stator remains essentially constant during tilting of the motor housing.

5. The system of claim 1, wherein the second portion of the bearing plate is eccentrically mounted to the transmission housing.

6. A steering system, comprising:
   a gear wheel in a transmission housing and configured to bias a worm gear shaft operably connected to a motor shaft rotatably supported in a motor housing; and
   wherein the transmission housing is connected and tiltable relative to the motor housing to move the worm gear shaft toward or away from the gear wheel via first and second parts of a bearing plate fastened and elastically coupled to one another by an elastic element.

7. The system of claim 6, wherein the elastic element is configured to compensate for radial or tangential shifts in a position of the worm gear shaft relative to the gear wheel.

* * * * *